United States Patent
Goldenstein et al.

(10) Patent No.: US 10,946,575 B2
(45) Date of Patent: Mar. 16, 2021

(54) DEVICE AND METHOD FOR CALIBRATING A BLOWN FILM

(71) Applicant: Windmöller & Hölscher KG, Lengerich (DE)

(72) Inventors: Jens Goldenstein, Lengerich (DE); Henning Steuter, Lengerich (DE)

(73) Assignee: Windmöller & Hölscher KG, Lengerich (DE)

(*) Notice: Subject to any disclaimer, the term of this patent is extended or adjusted under 35 U.S.C. 154(b) by 289 days.

(21) Appl. No.: 15/580,532

(22) PCT Filed: Jun. 8, 2016

(86) PCT No.: PCT/EP2016/062998
§ 371 (c)(1),
(2) Date: Dec. 8, 2017

(87) PCT Pub. No.: WO2016/198437
PCT Pub. Date: Dec. 15, 2016

(65) Prior Publication Data
US 2019/0217521 A1  Jul. 18, 2019

(30) Foreign Application Priority Data
Jun. 8, 2015 (DE) .......................... 102015210467.2

(51) Int. Cl.
*B29C 48/88* (2019.01)
*B29C 48/10* (2019.01)
(Continued)

(52) U.S. Cl.
CPC ............ *B29C 48/913* (2019.02); *B29C 48/06* (2019.02); *B29C 48/10* (2019.02); *B29C 48/155* (2019.02);
(Continued)

(58) Field of Classification Search
CPC ................................ B29C 48/913; F16K 3/03
See application file for complete search history.

(56) References Cited

U.S. PATENT DOCUMENTS 3,886,243 A * 5/1975 Uemura .................. B29C 48/92
264/40.3
3,904,334 A 9/1975 Okada et al.
(Continued)

FOREIGN PATENT DOCUMENTS

DE 1937978 A1 4/1970
DE 102008050229 A1 * 4/2010 ............. B29C 48/90
(Continued)

OTHER PUBLICATIONS

Atsushi, Igarashi, English translation of JPS495739 (B1), Aug. 2, 1974 (Year: 1974).*
(Continued)

*Primary Examiner* — Anthony Calandra
*Assistant Examiner* — Eric T Chen
(74) *Attorney, Agent, or Firm* — Peter W. Schroen; Bret E. Field; Bozicevic, Field & Francis LLP

(57) ABSTRACT

A device and a method for calibrating a blown film are provided, said device comprising: a tubular region with at least one inner wall, through which region the blown film can be passed; a liquid reservoir, which can be used to provide a liquid and which is situated above the tubular region, the liquid being guidable between the inner wall and the blown film; and a suctioning device, situated below the tubular region, for suctioning off at least part of the liquid from the blown film. At least one liquid-permeable element is provided, said element surrounding at least parts of the periphery of the blown film. This device permits the distance of the liquid-permeable element from the main axis of the blown film to be altered.

11 Claims, 5 Drawing Sheets

Figure 1:
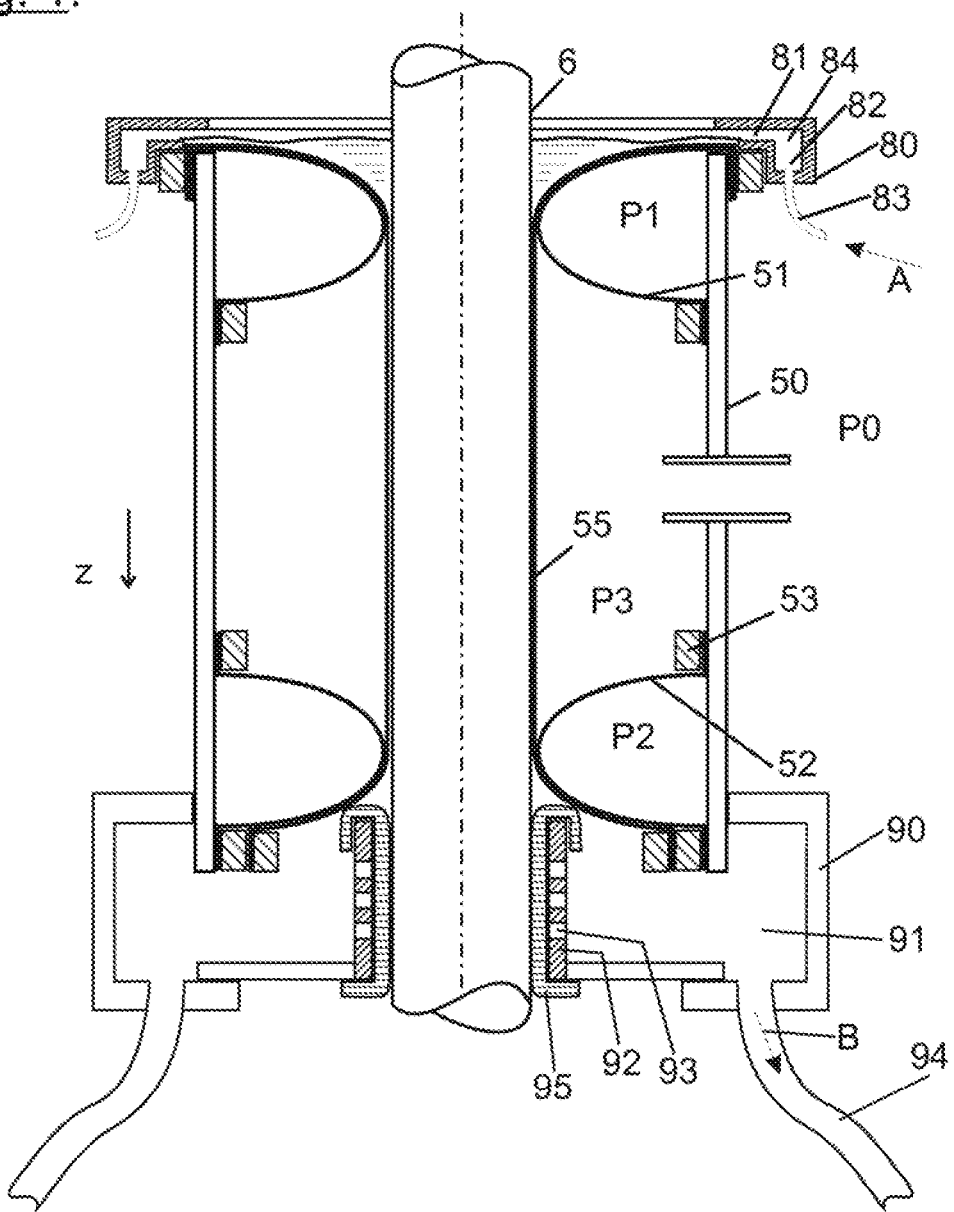

(51) Int. Cl.
*B29C 48/90* (2019.01)
*B29C 48/92* (2019.01)
*B29C 48/06* (2019.01)
*B29C 48/155* (2019.01)
*B29C 48/285* (2019.01)
*B29C 55/28* (2006.01)

(52) U.S. Cl.
CPC ........ *B29C 48/2883* (2019.02); *B29C 48/903* (2019.02); *B29C 48/907* (2019.02); *B29C 48/908* (2019.02); *B29C 48/92* (2019.02); *B29C 55/28* (2013.01); *B29C 2948/92619* (2019.02); *B29C 2948/92923* (2019.02)

(56) References Cited

U.S. PATENT DOCUMENTS

| | | | |
|---|---|---|---|
| 3,958,913 A | | 5/1976 | Stangl |
| 2009/0302252 A1* | | 12/2009 | Cheung ................ F02D 9/14 |
| | | | 251/212 |
| 2013/0161852 A1* | | 6/2013 | Goldenstein ........... B29D 23/00 |
| | | | 264/40.1 |
| 2013/0299418 A1* | | 11/2013 | Chamyvelumani ... B29C 48/397 |
| | | | 210/504 |

FOREIGN PATENT DOCUMENTS

| | | | | |
|---|---|---|---|---|
| JP | S49-5739 | B1 | 2/1974 | |
| JP | S495739 | B1 * | 2/1974 | ............ B29C 49/00 |
| JP | S59-29212 | U | 2/1984 | |
| JP | H02128827 | | 5/1990 | |
| WO | WO2012032128 | A1 | 3/2012 | |

OTHER PUBLICATIONS

Broege, Joerg, English machine translation of DE102008050229A1, Apr. 8, 2010 (Year: 2010).*
PCT Notification of Transmittal of Copies of Translation of the International Preliminary Report of Patentability dated Dec. 21, 2017, issued for PCT Application No. PCT/EP2016/062998, as well as the English translation document, 9 pages.

* cited by examiner

DEVICE AND METHOD FOR CALIBRATING A BLOWN FILM

The invention relates to a device for cooling a blown film according to the preamble of claim 1 and a method according to the preamble of claim 13.

A blown film, as is generated by a blown film device, is then cooled and also calibrated as a rule, so that it has a uniform diameter. To produce certain properties, the blown film can be cooled especially quickly by a liquid. Here the blown film as a rule is extruded in the direction of gravity. Often the blown film consists of plastic.

A device set up hereon for cooling has a device for delivery of the liquid to the outer wall of the blown film. Liquid cooling withdraws from the blown film a part of the warmth more quickly than would be possible with a gas. The liquid applied to the blown film is again removed as completely as possible as a rule, before further processing of the blown film, especially being wound up in a winding device. For this, at least one diversion element is provided, which serves for diversion of at least a part of the liquid from the blown film, especially from its outer wall. With this, the diversion element surrounds at least parts of the blown film in the peripheral direction.

Therefore WO 2011/058072 A1 discloses a device and a method for cooling a blown film, wherein a suctioning device for suctioning the cooling liquid is included, which includes a liquid-permeable element. With this, on one side the water is suctioned away, and on the other side also the film is secured, since the latter could be torn due to gravity when using certain materials.

However, it can happen that despite calibration, the dimensions of the blown film are altered upon emerging from the calibration device, so that the suctioning device can no longer fully carry out its function.

Therefore, it is the object of the present invention to further develop a method for cooling a blown film, so that under varying operating conditions, the liquid is suctioned as reliably as possible from the outer surface of the blown film.

According to the invention, this object is attained by all the features of claim 1. In the dependent claims, possible embodiments of the invention are indicated.

According to the present invention, provision is made that the interval which the diversion element assumes from the main axis of the blown film, is alterable. If there should result a change in the format of the blown film, then the diversion element can be adjusted for this in such a way that then the liquid is removed as much as possible from the outer surface of the blown film, and no damage to the blown film need be done. With this, a format alteration of the blown film can be intended. The diversion element itself can include one or more of the following configurations:

suctioning device
device for liquid blowoff
device for knockoff of liquid
device for cleaning off of liquid
device for evaporation of liquid
device for arrangement of a flow separation edge It is preferable if the diverted liquid can be collected in a tank. From this tank, the liquid can be directed by means of a feeding device, for example a hose, into the liquid reservoir. It is advantageous to provide a device to determine the liquid level in the liquid reservoir, so that a valve can be regulated, so that only so much liquid can be added until the target liquid level is reached. Thus, a liquid level control within the liquid reservoir is implemented.

Water is especially preferred as the liquid, because it is easy to handle.

In one advantageous embodiment of the invention, the adjustment range, which is the range in which the interval of the diversion element to the main axis of the film is adjustable, preferably at least +/−10 mm and/or up to +/−500 mm.

In one embodiment of the invention, a device is provided for preparation of the liquid. Such a device can for example be a deliming device, a desalinization device, a filtering device or a disinfectant device. It is advantageous if the liquid is as free as possible from foreign materials, which could have negative effects on the blown film itself or for further use of this blown film.

It is advantageous if the device for delivery of the liquid includes at least one film guidance element with at least one inner wall, which is situated at least in part around the blown film, and along which the blown film can be guided. In other words, the blown film, while it is being impinged on by the liquid, is guided by a film guidance element. By this means especially it is possible to channel the liquid and keep it close to the blown film, so that only one liquid film is necessary for cooling. By this means, loss of liquid by producing water sprays is avoided. At the same time, the liquid causes the blown film to avoid touching the film guidance element, so that a smaller degree of damage is done to the blown film.

A single film guidance element, or a plurality of such, surrounding the blown film, can also serve to calibrate the blown film.

The one film guidance element or the plurality of film guidance elements, often circumscribe a tubular area with at least one wall directed inward, i.e. in the direction of the blown film, through which the blown film can be passed. As a rule blown film is rotationally symmetric, with the direction of transport and the axis of symmetry being parallel to each other. The axis of symmetry is essentially congruent with the main axis of inertia of the blown film within the calibrating device. The main axis of inertia is designated for short as the main axis in what follows.

Thus, in WO 2012/032128 A1 a calibrating device is disclosed, which is adjustable over wide ranges for a change in the format of the blown film. The present invention is therefore especially advantageously able to be combined with a calibrating device as per WO 2012/032128 A1. The disclosure there of a variable-format calibrating device thus counts as being incorporated into this patent application. The interval that the liquid-permeable element assumes to the blown film, is adjustable between a minimal interval and a maximal interval, with the maximal interval preferably being 1.2 times the minimal interval.

In one invention-specific device, provision is made that the blown film is able to be impinged on from within by a pressure, so that in comparison to the diameter which it has upon extrusion from an annular nozzle, the blown film expands out in the radial direction. Through this pressure, which especially is an excess pressure, the blown film is compressed against the film guidance element, which then produces a counterforce. As a rule the radial expansion is designated as a blowup ratio, which in connection with an invention-specific device for cooling amounts to 1.1 to 3. This means that the diameter of the blown film compared to the diameter of the annular nozzle grows by 10% to 200%.

It is preferred if a liquid reservoir is provided in the upper area of the film guidance device, or above it, by which the liquid can be provided, especially with the liquid able to be passed between the film guidance element and the blown film (6). In particular the inlet area of the film guidance device can form the liquid reservoir for the blown film, so that no separate device is necessary. This represents a cost savings. Additionally, a compact unit is produced thereby, which ends up with a structural height as low as possible.

Additionally, preferably provision is made that the diversion element is placed beneath, and especially directly beneath, the at least one film guidance element. Thus a compact unit is produced, which ends up with a structural height as low as possible. Additionally, what is avoided is that liquid drips from the blown film and can get into places in which no accumulations of liquids are intended.

In one preferred embodiment, multiple diversion elements are provided, which in their totality completely surround the blown film. Each diversion element forms a segment, so that a diversion device is provided which is segmented. Thus, each segment covers an arc segment of the blown film, with each segment covering a corresponding altering arc segment when the format of the blown film is altered. In this way, an easy option is created for adjusting the suctioning device to a desired diameter.

In one advantageous embodiment of the invention, a single diversion element is provided, which overlaps itself in partial areas in the circumferential direction. If the blown film has a small diameter, the area in which the diversion element overlaps itself is larger than in the case where the blown film has a large diameter. In other words, for reduction of the diameter of the diversion element, the overlapping area is enlarged. In an alternative embodiment, multiple diversion elements are provided, with one diversion element overlapping partial areas of at least one adjoining diversion element. This alternative embodiment offers the same advantages as the embodiment initially specified, but it relates to the diversion element being segmented. The two previously named alternatives can be provided in combination a single time or in multiples, as viewed in the direction of transport, so that multiple diversion elements, arranged one over the other, can be provided.

To be able to adjust the diameter, it is advantageous to provide at least one support element able to be moved relative to the blown film in the radial direction. The diversion element can be attached to this support element, or it can be braced on it in the radial direction. In the case of bracing in the radial direction, provision can be made that the diversion element is prestressed in the radial direction, so that it exerts a force against the support element. If the support element is now moved outwards, then the support element also performs this outward motion, so that the interval of the diversion element to the main axis of the blown film becomes larger. Overall, with the radially movable support element, a simple option is produced to adjust the named interval. With this, a plurality of such support elements can be provided, which then in essence are distributed evenly over the periphery of the blown film. It is understood that the support element or elements are situated on the side facing away from the blown film of the diversion element or elements.

In one advantageous embodiment of the invention, a slider-on-rail arrangement is provided, by which the at least one diversion element is movable in the radial direction of the blown film. The rails of this rail-supported slider arrangement are preferably already situated in the radial direction, so that a slider running on these rails can be moved in a simple way in the radial direction. Particular advantages of this rail & slider arrangement appear with the already named support element, because in this case the support element can be moved in simple fashion in the radial direction, so that a diversion element attached to this support element, or braced on this support element, can be movable simply and also precisely, and thus be adjusted in its interval. Such a railed slider arrangement can for example already include a linear motor, by which a force can be directly transmitted.

In fact in one preferred embodiment a drive is provided, which acts on drive force transmission means, by which a drive force can be transmitted to the at least one diversion element to alter the named interval. With this, the drive force made available by the drive is not directly provided on the diversion element. Thus for example a single drive can be provided, which supplies a plurality of diversion elements with a drive force, which represents a cost savings.

It is advantageous if the drive force transmission means include at least one chain, which especially drives at least one follower, which acts directly or indirectly on the support element. It is preferred that the follower is attached on the chain and drives the slider already mentioned above. It is advantageous if the chain is guided via a section parallel to the rail on which the slider is gliding. Provision of a chain is an inexpensive option for transmitting the drive force. Instead of a chain, a toothed belt, bands or wires can be provided, thus any flexible means of transmission that does not become longer, or not appreciably so, upon application of the drive force. A lengthening that cannot be completely precluded can be compensated by a tensioning wheel.

In one advantageous embodiment of the invention, provision is made that the diversion element includes a plate equipped with passages and/or apertures. This plate can especially be a metal plate. However, it can also be a plate made of plastic or some other material. However, it is important that the plate have a certain elasticity, i.e. that its radius be adaptable at least within certain limits to the diameter of the blown film. Preferably the plate also has reset forces similar to a spring-loaded element, so then when adjusting a diversion element to a larger diameter, the radius of the plate automatically adjusts. If a metal plate is provided, preferably it is configured to be rust-resistant, such as by choice of an appropriate alloy or being coated with a rust-resistant material. This coating can be a plastic coating. The plate can be provided with round holes or elongated holes, with this able to be produced in a suitable way, for example by machining, by stamping or also by non-contact processing like laser cutting. In place of a plate, a wire grid or network can also be provided, with this grid advantageously able to be attached to a frame.

To further reduce damages to the blown film, especially with use of metal plates, provision is made that the upper surface of the diverting element facing the blown film include material, fleece, felt and/or a fabric. It is important that this be a soft material which is nevertheless liquid-permeable, preferably to a sufficient degree that the liquid is able to be suctioned out as completely as possible from the surface of the blown film. The material itself is preferably water-repellant, i.e. it does not admit water, which could lead to swelling.

Another advantageous embodiment can also include a plurality of pins, which are directed radially to the blown film. On their ends that face the blown film, these pins preferably have rounded heads, which can guide the blown film. These pins can be supported so as to shift in boreholes of plates, to make possible adaption to the diameter of the blown film. Between the pins there is a free volume, via which the liquid can be suctioned out.

The specified object is also attained by the features of claim 13. Accordingly, provision is made that with a change in the diameter of the blown film, the interval which the diversion element (100) assumes to the main axis of the blown film (6) is altered. The same advantages are obtained thereby as have been described in connection with the invention-specific device.

Additionally, the object is achieved by a blown film unit, which includes a device as per the specification above and/or a device as per claims 1 to 12.

An invention-specific blown film unit includes a lay-flat device, which adjoins the device for cooling of the blown film in the transport direction of the blown film.

In one invention-specific blown film unit, a blown film can be produced, the wall thickness of which is less than 5 mm, especially less than 1 mm and preferably less than 0.5 mm.

In one invention-specific blown film unit, the interval between the extruding tool and the device for cooling the blown film is adjustable. For this, the device for cooling the blown film is placed on a height adjustment device.

In one invention-specific blown film unit, preferably the drawing factor, thus the length alteration, is at least 2 and/or at most 100, preferably in a range between 5 and 15, both in the peripheral direction and in the transport direction. Such a drawing factor simultaneously results in a correspondingly small wall thickness of the blown film.

Once again it is explicitly mentioned that the object is also obtained by a calibration device, which includes a device according to the specification above and/or a device according to claims 1 to 12.

Figure 2:
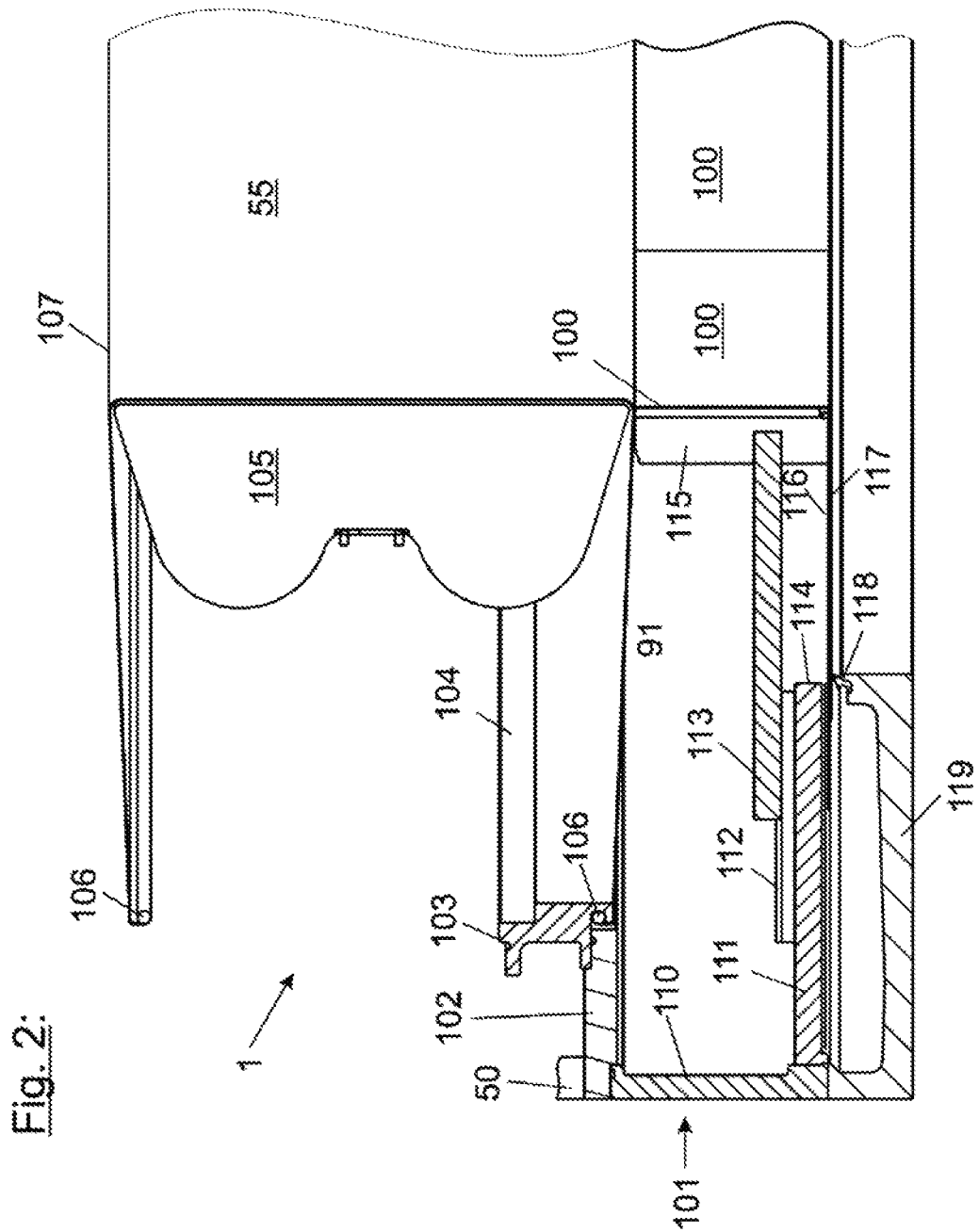
Figure 3:
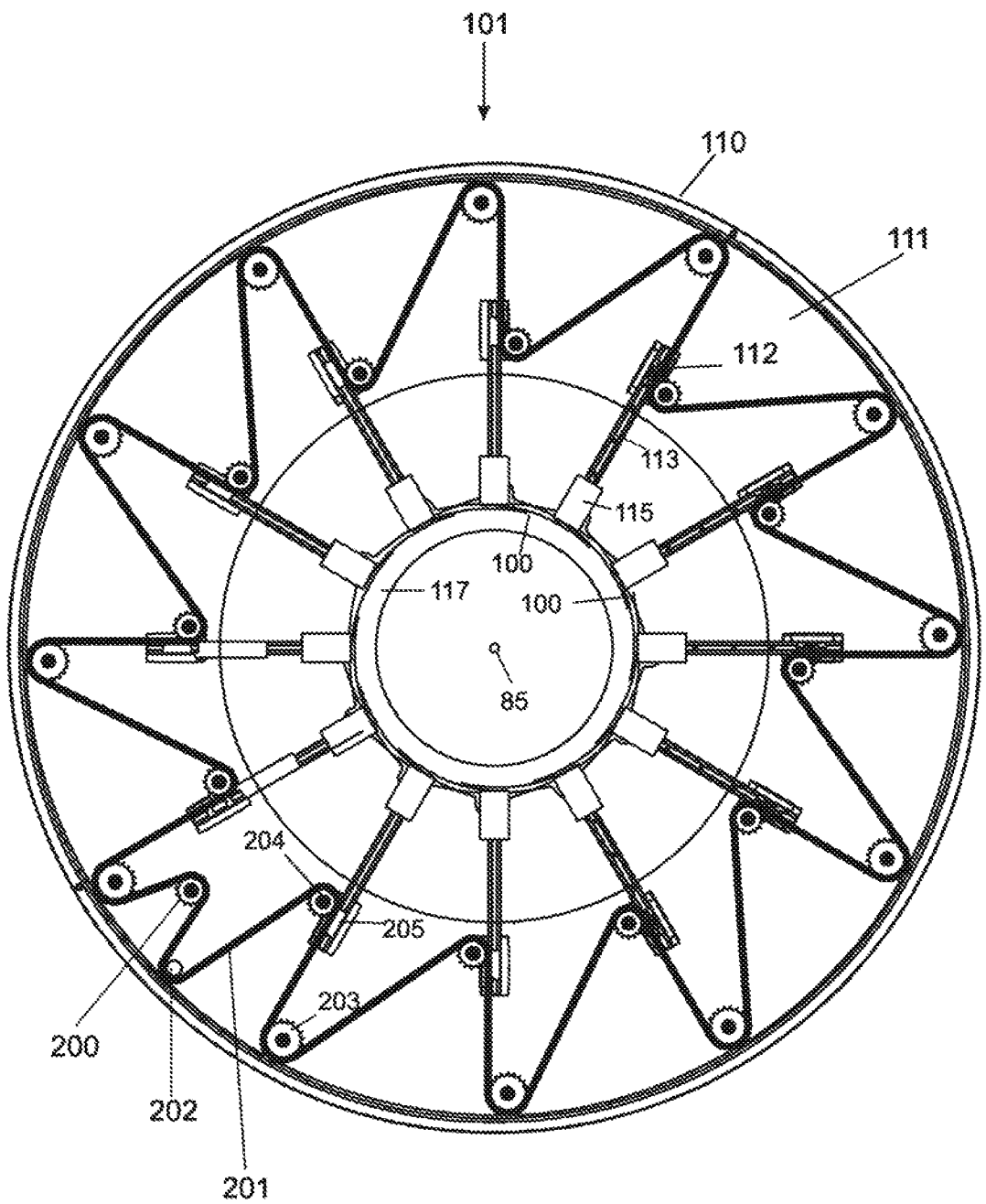
Figure 4:
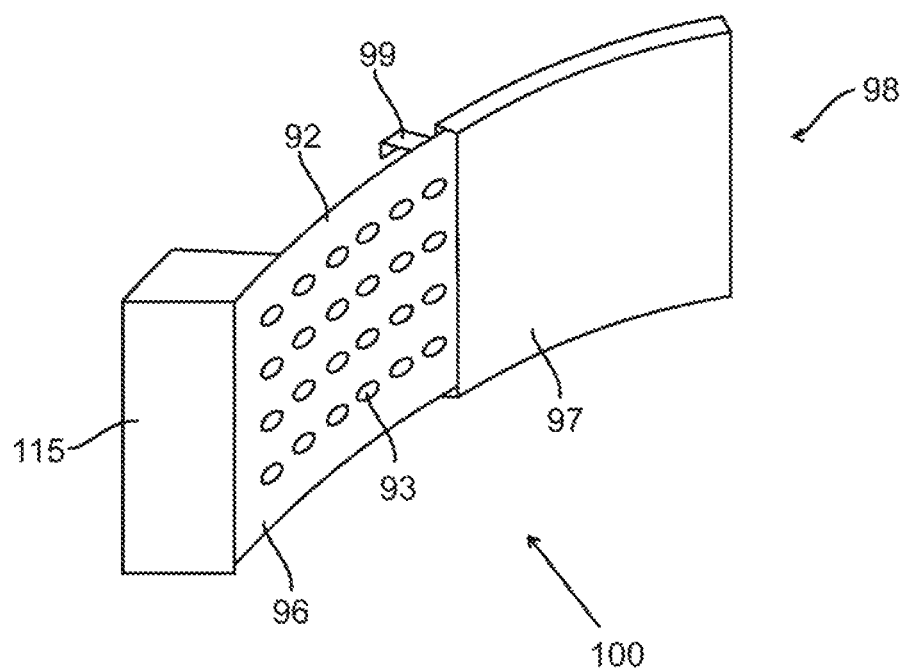
Figure 5:
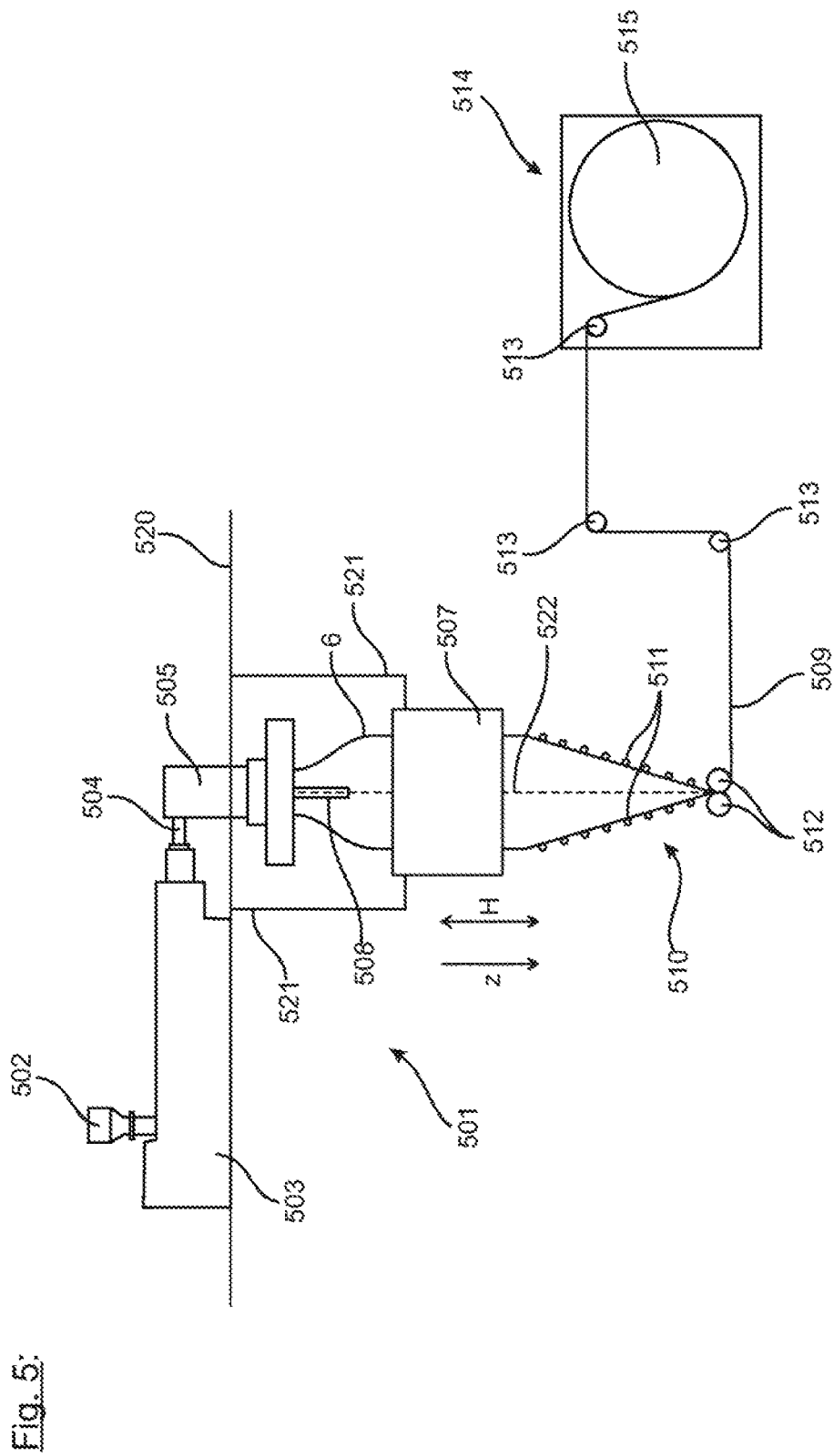

Further advantages, features and particulars of the invention are gleaned from the specification which follows, in which various embodiments are explained in particular with reference to the figures. The features mentioned in the claims and in the specification can be essential to the invention individually per se or in whatever combinations. As part of the overall disclosure, features and particulars are valid which are described in connection with the invention-specific method, understandably also in connection with the invention-specific device and vice versa, so that as regards the disclosure to the individual aspects of the invention, reciprocal reference is made or can be made. The individual figures show:

FIG. 1: a view of a calibration device, by which the diameter of the tubular area is able to be altered FIG. 2: a section through an invention-specific calibration device FIG. 3: a top-down view of the suctioning device FIG. 4: a liquid-permeable element FIG. 5: an invention-specific blown film unit FIG. 1 shows a calibration device 1, wherein in this embodiment the diameter of the tubular area can be altered.

Above the sheath 50 a ring 80 is provided, which includes a surrounding opening 81 on its inner side and which an annular chamber 84 encloses. Viewed in the radial direction, ring 80 projects out beyond the sheath. In this part projecting beyond sheath 50, a circumferential recess 82 is made, that can serve as a liquid reservoir. The liquid is fed via feed hose 83, which advantageously can be distributed evenly over the periphery of the ring, which is indicated by arrow A. At a sufficiently high liquid level within the annual chamber, the liquid emerges from surrounding opening 81 and runs into the inlet area between the elastically deformable, tubular area 55 and the blown film 6. Here a liquid ring is formed. The blown film carries along a part of the liquid, with the later cooling the blown film. Blown film 6 is moved in transport direction z. Blown film 6 is characterized by its axis of symmetry 85, which simultaneously is its main axis of inertia or, for short, its main axis.

To be able, after its cooling action, to again remove the liquid from the blown film, below the tubular area a suctioning device 89 is placed. This includes a ring 90, which likewise forms an annular chamber 91. The inner wall 92 is provided with openings 93, through which the water can be suctioned from the surface of the blown film. For suctioning, annular chamber 91 is attached via one or more hoses 94 to a negative pressure source. The suctioning direction is indicated by arrow B. So that blown film 6 is not damaged at the openings 93, they are covered with a porous material 95, through which however the liquid can pass, but which avoids a deformation of the material of the blown film. Something like a fabric, for example a textile fabric, can serve as the material. Many other materials which have properties suitable for the named application, are conceivable. The inner wall 92, openings 93 and material 95 together form a liquid-permeable element 100 designated as a diversion element. The device and the method for altering the inner diameter of the tubular area are disclosed in FIGS. 11 and 12 as well as the pertinent specification sections of the publication WO 2012/032128 A1. These citations hereby are deemed as being included in this patent application. However, this is only an embodiment of a calibration device with a tubular area whose diameter can be altered. Also other embodiments of such a calibration device are advantageously able to be combined with suctioning devices as are explained using FIGS. 2 and 3 and the portions of the specifications that follow.

FIG. 2 shows a part of a view through a section of an invention-specific calibration device 1 with a suctioning device 101. The blown film 6 is not shown in this view for the sake of visibility. The sheath 50 has a support ring 102 on its underside, on which, via an intermediate ring 103 and a holding device 104, an annular body 105 is braced, by which the diameter of the tubular area 55 is adjustable, which does not need to be explained here in greater detail. The tubular area preferably is formed by a cylinder 107 made of a flexible material, which is drawn from the inner area via the annular body outward, and attached by means of attachment rings 106 on a suitable component, here intermediate ring 103.

Below sheath 50 a sheath catch 110 is provided, which bears a carrying plate 111 extending inward. On carrying plate 111, a rail is arranged 112, on which the slider 113 is movable, especially in the radial direction r of the blown film. The inner wall 114 is at a large interval to the main axis of the blown film, so that when the calibrating device is adjusted to the largest possible blown film guidable with the calibrating device, the carrying plate represents no limitation. On its end facing the main axis of the blown film, slider 113 carries a support element 115, on the inner surface of which liquid-permeable element 100 is arranged. In the embodiment shown, multiple liquid-permeable elements 100 are provided, of which two are depicted.

So that an annular chamber can be formed, beneath each support element 115 at least one sheet plate 116 is provided, which is able to be shifted with support element 115. Preferably this sheet plate is attached to the support element. Beneath sheet plate 116, a flat flexible ring 117, especially a rubber ring, is placed, the inner edge of which is set up to remove liquid which could not be suctioned out by means of the suctioning device from the outer surface of the blown film. So that also the inner edge of the rubber ring is adjustable in regard to the interval to the main axis of the blown film, the latter can be stretched in a radial direction, which preferably occurs simultaneous with adjustment of the interval of the liquid-permeable elements. Beneath flexible ring 117, an encircling seal 118 is arranged, which adjoins the flexible ring in sealing fashion on one side, and on the other side is admitted into a groove of the lower closing ring 119. The lower closing ring 119 is attached to sheath catch 110.

Altogether with the suctioning device described, an annular chamber 91 is formed, which is able to be impinged on by negative pressure for the purpose of suctioning the liquid out. By this means, flexible ring 117 is drawn against the at least one sheet plate, wherein flexible ring 117 especially also adjoins the bottom edge of the liquid-permeable elements. Above the liquid-permeable elements 100, chamber 91 is formed by cylinder 107, intermediate ring 103 and support ring 102. To attain an enhanced sealing effect, the annular body 105 can be braced at least in part by its weight on support element 115.

FIG. 3 is a top-down view of suctioning device 101, wherein some reference symbols already explained in FIG. 2 are also incorporated into FIG. 3.

It is clearly seen that multiple liquid-permeable elements 100 are provided, each of which overlaps the adjoining element or is overlapped by the adjoining element.

Perceived in FIG. 3 are drive force transmission means which are explained in greater detail in what follows. A toothed drive wheel 200 is driven by a drive motor not depicted, preferably by an electric motor, and transmits the drive force to the chain 201. Chain 201 is tensioned by the chain tensioners 202, so that the wear of the chain can be equalized. In the area of each support element 115, the chain is guided via an outer toothed wheel 203 and an inner toothed wheel 204, with these toothed wheels arranged in such a way that the chain runs between them essentially in a radial direction. In the area between the two toothed wheels, a follower 205 is attached, which transmits the drive force from the chain to slider 113 and thus causes a shifting of the support element and thus of the liquid-permeable element 100 relative to main axis 85.

FIG. 4 shows a liquid-permeable element 100, as is provided in an invention-specific calibrating device. It first includes a plate 92, into which numerous openings 93 are made. On a first end 96, the element 100 is attached to support element 115.

On element 100, additionally a material 95 is arranged, which advantageously is configured as a pocket-shaped covering 97. This covering 97 can be moved in or away from the peripheral direction of the blown film, so that it is possible to change out coating 97 via the free end 98 of element 100 without great expense. In addition, advantageously at least one hook 99 is provided, which is situated on the upper and/or lower edge of element 100, and by which element 100 is hooked into adjoining element 100, which is covered by element 100. What is attained in this way is that the majority of elements 100 more closely approximate a circular shape, and this is maintained also with a change in the interval.

Finally, FIG. 5 shows an invention-specific blown film unit 501. A plastic is brought to the filling sleeve 502, which then is plastified in the extruder 503. The mass that is produced is fed via a connection line 504 to the blower head 505, with which, from the mass, a blown film 6 is formed. Additional extruders can be assigned to blower head 505, so that multilayer films can be produced. The extruders can be arranged on an elevated platform 520, on which blower head 505 is also suspended. A carrying device 521 can also be arranged on this platform. This carrying device bears the calibration basket 507 described below in further detail, wherein the carrying device includes a height adjustment by which the interval of calibration basket 507 to the blower head is adjustable. This situation is clarified by the double arrow H.

Blown film 6 leaves the blower head through an annular nozzle not visible in this depiction in transport direction z. The dashed line 522 represents the axis of symmetry of blown film 6.

Upon leaving blowing head 5, blown film 6 is initially present as a foil bubble, in which counter to the ambient pressure there is a slightly elevated interior pressure. This is attained by feeding in compressed air through blower nozzle 508. Due to the elevated interior pressure, the not-yet-solidified material of blown film 6 expands. Ultimately in this way the diameter of the completed blown film 6 as well as the thickness of the film material is adjusted.

Then the not-yet-solidified film bubble 6 gets into the calibration and cooling device designated as the calibrating basket 507. Here the diameter of the blown film is limited. Within calibrating basket 507, the blown film cools down to a temperature at which it is not possible to have subsequent deformation, or only if high levels of force are applied. The position at which this phase transformation occurs is often designated as the "frost line."

Calibrating basket 507 can be configured according to one or various embodiments, as it is described as part of the present patent application and shown in the figures.

After leaving calibrating basket 507, blown film 6 reaches a lay-flat device 510, in which blown film 6 is reshaped nearly or fully into a dual layer film path 509. Blown film 6 is guided between pairs of guiding elements 511, which, in the course of transport direction z assume an ever smaller distance from each other. The complete flattening is done by a squeezing device which consists of a pair of squeezing rollers 512. Squeezing rollers 512 prevent air from remaining within the blown film during its further transport.

Blown film 6 or the film path 509 derived therefrom can additionally be guided through a reversing device which is not shown, or, in the case of the device shown, directly via deflecting rollers 513 of a winding device 514, where the film path can be processed into a winding 515.

| List of Reference Symbols | |
|---|---|
| 1 | Calibration device |
| 6 | Blown film |
| 50 | Sheath |
| 55 | Elastically deformable tubular area |
| 80 | Ring |
| 81 | Surrounding opening |
| 82 | Surrounding recess |
| 83 | Feed hoses |
| 84 | Annular chamber |
| 85 | Axis of symmetry |
| 89 | Suctioning device |
| 90 | Ring |
| 91 | Chamber |
| 92 | Inner wall |
| 93 | Opening |
| 94 | Hoses |
| 95 | Porous material |
| 96 | First end |
| 97 | Pocket-shaped covering |
| 98 | Free end |
| 99 | Hook |
| 100 | Liquid-permeable element |
| 101 | Suctioning device |
| 102 | Support ring |
| 103 | Intermediate ring |

List of Reference Symbols

| | |
|---|---|
| 104 | Holding device |
| 105 | Annular body |
| 107 | Cylinder |
| 110 | Sheath catch |
| 111 | Support plate |
| 112 | Rail |
| 113 | Slider |
| 114 | Inner wall |
| 115 | Support element |
| 116 | Sheet plate |
| 117 | Flexible ring |
| 118 | Encircling seal |
| 119 | Closing ring |
| 200 | Toothed drive wheel |
| 201 | Chain |
| 202 | Chain tensioner |
| 203 | Outer toothed wheel |
| 204 | Inner toothed wheel |
| 205 | Follower |

The invention claimed is:

1. A device for cooling of a blown film, wherein the device comprises:
 a device for delivery of liquid to the outer wall of the blown film, wherein the film can be cooled with the liquid,
 two or more diversion elements for diversion of at least a part of the liquid from the blown film, wherein each diversion element comprises a liquid-permeable element that surrounds at least parts of the blown film,
 wherein the device for delivery of liquid includes at least one film guidance element with at least one inner wall, which is arranged at least in part around the blown film and along which the blown film is guidable,
 wherein:
 the two or more diversion elements are arranged beneath the at least one film guidance element, wherein each diversion element overlaps itself or at least one other adjoining diversion element in partial areas and in their totality completely surround the blown film, and
 a radial interval which the two or more diversion elements assume to the axis in the axial direction of the blown film, is alterable.

2. The device of claim 1, wherein above or in the upper area of the film guidance element a liquid reservoir is provided, with which the liquid can be made available, wherein especially the liquid can be directed between the film guidance element and the blown film.

3. The device of claim 1, wherein at least one support element that is movable relative to the blown film in the radial direction is provided, on which the two or more diversion elements are attached, or on which it is braced in the radial direction.

4. The device of claim 1, wherein a rail-and-slider arrangement is provided, with which the two or more diversion elements are movable in the radial direction of the blown film.

5. The device of claim 1, wherein a drive is provided, which acts on drive force transmission means, with which a drive force can be transmitted to the two or more diversion elements for alteration of the radial interval.

6. The device of claim 5, wherein the drive force transmission means include at least one chain, which especially drives at least one follower, which acts directly or indirectly on the support element.

7. The device of claim 1, wherein each of the two or more diversion elements comprises a plate provided with apertures.

8. The device of claim 1, wherein the surface of each of the diversion elements facing the blown film comprises a material made of fleece, felt or a fabric.

9. The device of claim 1, wherein the two or more diversion elements include a plurality of pins directed radially to the blown film.

10. The device of claim 7, wherein the plate is a metal plate.

11. A method for cooling a blown film in which:
 with a device for application of liquid, a liquid is applied to the outer wall of the blown film, whereby the film is cooled by the liquid,
 with two or more diversion elements for diversion at least of a part of the liquid from the blown film is diverted, wherein each diversion element comprises a liquid-permeable element that surrounds at least parts of the blown film in the peripheral direction,
 the device for application of liquid includes at least one film guidance element with at least one inner wall, which is arranged at least in part around the blown film and along which the blown film is guided,
 wherein:
 each of the two or more diversion elements overlaps itself or at least one other adjoining diversion element in partial areas and in their totality completely surround the blown film, and with an alteration in the diameter of the blown film, a radial interval which the diversion elements assume to the axis in the axial direction of the blown film, is altered.

* * * * *